(12) United States Patent
Gore

(10) Patent No.: US 7,270,944 B2
(45) Date of Patent: Sep. 18, 2007

(54) COMPOSITIONS, SYSTEMS, AND METHODS FOR IMAGING

(75) Inventor: Makarand P. Gore, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 213 days.

(21) Appl. No.: 11/092,407

(22) Filed: Mar. 29, 2005

(65) Prior Publication Data

US 2006/0228514 A1   Oct. 12, 2006

(51) Int. Cl.
*G03C 1/73* (2006.01)
*G03C 5/16* (2006.01)
*G03C 5/22* (2006.01)

(52) U.S. Cl. .............. 430/338; 430/340; 430/343; 430/964; 503/218

(58) Field of Classification Search ................ 430/338, 430/340, 343, 964; 503/218
See application file for complete search history.

(56) References Cited

U.S. PATENT DOCUMENTS

| | | | |
|---|---|---|---|
| 3,658,543 A | 4/1972 | Gerlach, Jr. et al. | |
| 4,142,151 A | 2/1979 | Hansen | |
| 4,170,190 A | 10/1979 | Warner | |
| 4,443,302 A | 4/1984 | Gendler et al. | |
| 4,478,687 A | 10/1984 | Gendler et al. | |
| 4,552,980 A | 11/1985 | Gabrielsen | |
| 4,563,415 A | 1/1986 | Brown et al. | |
| 4,647,525 A | 3/1987 | Miller | |
| 4,670,374 A | 6/1987 | Bellus et al. | |
| 4,682,857 A | 7/1987 | Tan | |
| 4,782,010 A | 11/1988 | Mader et al. | |
| 4,835,475 A | 5/1989 | Hanakura et al. | |
| 4,835,476 A | 5/1989 | Kurosawa | |
| 4,838,664 A | 6/1989 | Graham | |
| 4,889,932 A | 12/1989 | Miller | |
| 4,891,250 A | 1/1990 | Webe et al. | |
| 4,983,498 A | 1/1991 | Rode et al. | |
| 4,994,337 A | 2/1991 | Masaki et al. | |
| 5,043,249 A | 8/1991 | Rode et al. | |
| 5,066,564 A | 11/1991 | Zertani et al. | |
| 5,234,797 A | 8/1993 | Satake et al. | |
| 5,294,374 A | 3/1994 | Martinez et al. | |
| 5,428,161 A | 6/1995 | Miller et al. | |
| 5,434,119 A | 7/1995 | Satake et al. | |
| 5,484,685 A | 1/1996 | Tai et al. | |
| 5,543,382 A | 8/1996 | Watanabe et al. | |
| 5,637,709 A | 6/1997 | Melzig | |

(Continued)

FOREIGN PATENT DOCUMENTS

EP    0 716 135    9/1999

(Continued)

OTHER PUBLICATIONS

H. Bouas-Laurent et al., "Organic Photochromism" (IUPAC Technical Report), Pure Appl. Chem., vol. 73, No. 4, pp. 639-665, 2001.

(Continued)

*Primary Examiner*—Richard L. Schilling

(57) ABSTRACT

A composition, method, and system for recording an image. The system includes a multiphase imaging material in which energy is absorbed by an antenna material. The absorbed energy causes the reaction of an oxidizer and a leucozine dye.

20 Claims, 1 Drawing Sheet

U.S. PATENT DOCUMENTS

| | | |
|---|---|---|
| 5,673,028 A | 9/1997 | Levy |
| 6,015,896 A | 1/2000 | Mistry et al. |
| 6,017,981 A | 1/2000 | Hugo |
| 6,022,648 A | 2/2000 | Jacobson et al. |
| 6,025,486 A | 2/2000 | Mistry et al. |
| 6,096,794 A | 8/2000 | Cunningham et al. |
| 6,132,931 A | 10/2000 | Kawamura et al. |
| 6,137,669 A | 10/2000 | Chiang et al. |
| 6,251,571 B1 | 6/2001 | Dessauer et al. |
| 6,309,797 B1 | 10/2001 | Grinevich et al. |
| 6,407,560 B1 | 6/2002 | Walraven et al. |
| 6,410,628 B1 | 6/2002 | Hall-Goulle et al. |
| 6,423,467 B1 | 7/2002 | Kawauchi et al. |
| 6,433,035 B1 | 8/2002 | Grinevich et al. |
| 6,486,473 B2 | 11/2002 | Salapow et al. |
| 6,549,025 B1 | 4/2003 | Tubera et al. |
| 6,709,800 B2 | 3/2004 | Fujita et al. |
| 6,749,999 B2 | 6/2004 | Yabuki et al. |
| 6,830,872 B2 | 12/2004 | Mizutani et al. |
| 6,835,725 B2 | 12/2004 | Berneth et al. |
| 6,844,146 B2 | 1/2005 | Hosokawa et al. |
| 6,974,661 B2 * | 12/2005 | Gore et al. .................. 430/343 |
| 2002/0045548 A1 | 4/2002 | Saito |
| 2002/0089580 A1 | 7/2002 | Suzuki et al. |
| 2002/0183203 A1 | 12/2002 | Hoefs et al. |
| 2003/0003399 A1 | 1/2003 | Muller et al. |
| 2004/0146812 A1 | 7/2004 | Gore et al. |
| 2005/0053748 A1 | 3/2005 | Gore et al. |

FOREIGN PATENT DOCUMENTS

| | | |
|---|---|---|
| JP | 02002060 A | 1/1990 |
| JP | 05-278329 | 10/1993 |
| JP | 07258561 A2 | 10/1995 |
| JP | 2002203321 A | 7/2002 |
| JP | 2004005847 A | 1/2004 |
| JP | 2004227752 A | 8/2004 |

OTHER PUBLICATIONS

"Protected Act ivators For Use In Leuco Dye Compositions," U.S. Appl. No. 10/656,735, filed Sep. 5, 2003, Hewlet t-Packard Company, pp. 1-28.

* cited by examiner

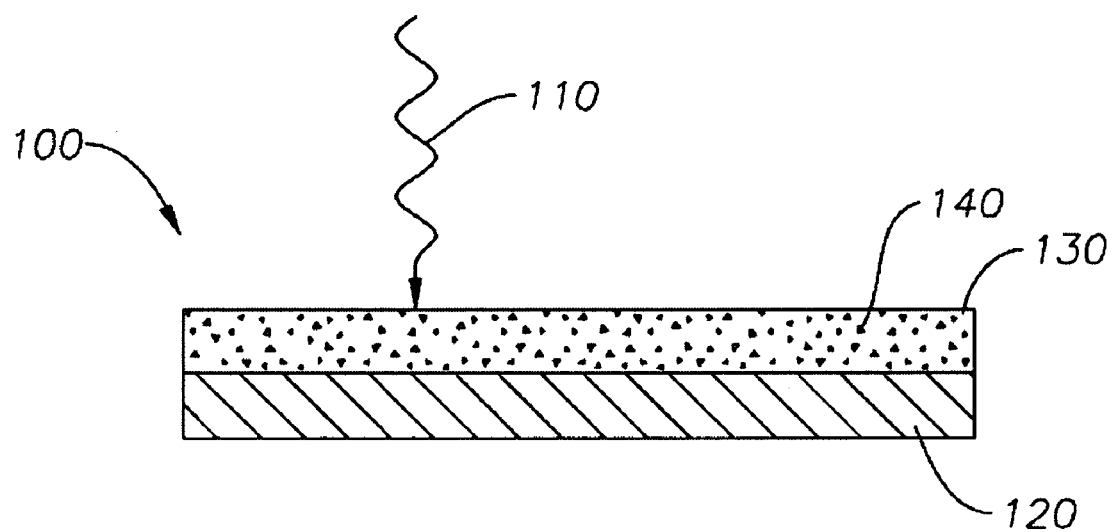

COMPOSITIONS, SYSTEMS, AND METHODS FOR IMAGING

BACKGROUND

Materials that produce color change upon stimulation with energy such as light or heat may have possible applications in imaging. For example, such materials may be found in thermal printing papers and instant imaging films. Generally, the materials and compositions known so far may require a multifilm structure and further processing to produce an image (e.g., instant imaging photographic films). And in the case of facsimile and thermal head media, high energy input of greater than 1 J/cm² may be needed to achieve good images. The compositions in multifilm media may require control of diffusion of color-forming chemistry and further processing, and are in separate phases and layers. Most thermal and facsimile paper coatings consist of coatings prepared by preparing fine dispersions of more than two components. The components mix and react upon application of energy, resulting in a colored material. To the necessary mixing, the particles need to contact across three or more phases or layers and merge into a new phase. Because of these multiple phases and layers, high energy is required to perform this process. For example, a relatively powerful carbon dioxide laser with an energy density of 3 J/cm² at times of much greater than 100 μs may be needed to produce a mark. In some instances, this high energy application may cause damage to the imaging substrate. In many situations, it may be desirable to produce a visible mark more efficiently using either a less intense, less powerful, and/or shorter energy application. Therefore, there is a need for fast marking coatings, possibly composed of fewer than three phases and in single layer.

SUMMARY

Disclosed herein are imaging materials and methods of making imaging materials. The materials disclosed herein may include an antenna, a leucozine dye and an oxidizer, all dispersed in a matrix. The leucozine dye and the oxidizer are present in the imaging material in two separate phases. The antenna readily absorbs energy which may be applied imagewise to the imaging materials. This absorbed energy heats the mixture which causes the leucozine dye and the oxidizer to mix and react, causing the leucozine dye to change color and a mark to be produced.

BRIEF DESCRIPTION OF THE DRAWINGS

For a detailed description of exemplary embodiments of the invention, reference will now be made to the accompanying drawings in which:

The FIGURE shows an imaging medium according to embodiments of the present invention.

NOTATION AND NOMENCLATURE

Certain terms are used throughout the following description and claims to refer to particular system components. As one skilled in the art will appreciate, companies may refer to components by different names. This document does not intend to distinguish between components that differ in name but not function. In the following discussion and in the claims, the terms "including" and "comprising" are used in an open-ended fashion, and thus should be interpreted to mean "including, but not limited to . . . ." The term "leucozine dye" is a color forming substance having the following chemical structure (Formula 1):

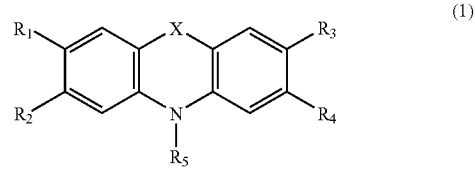

where X is any of nitrogen (for phenazine), sulfur (for thiazine), or oxygen (for oxazine); and $R_1$, $R_2$, $R_3$, $R_4$ and $R_5$ may each individually be any of H, $SO_2C_6H_5$, N-alkyl, N-alkyl$_2$, N-aryl, N-acyl, OH, O-acyl, acyl, or the functional group of Formula 2:

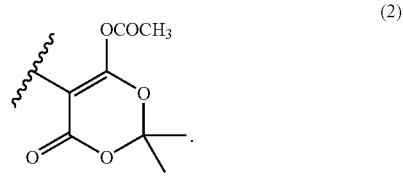

Examples of some leucozine dyes and methods of preparation may be found in Muthyala, R., Ed.; "Chemistry and Applications of Leuco Dyes" pp. 67-95 (Plenum Press, NY 1997). As used herein, the term "oxidizer" is a substance which oxidizes a leucozine dye, causing the leucozine dye to change or acquire color. For example, any compound that has electron deficient moiety capable of abstraction of electrons from an electron rich molecule such as a leucozine dye. The term "antenna" means a radiation absorbing compound. The antenna readily absorbs a desired specific wavelength of the marking radiation.

DETAILED DESCRIPTION

The following discussion is directed to various embodiments of the invention. The embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the invention include coatings that result in clear marks and excellent image quality when marked with a laser. The materials used to produce color change upon stimulation by energy may include a color-former such as a leucozine dye such as phenazine, oxazine, and/or thiazine and an oxidizer such as calcium nitrate dispersed in a matrix such as radiation-cured acrylate oligomers and monomers and applied to a substrate. In particular embodiments, either the leucozine or the oxidizer may be substantially insoluble in the matrix at ambient conditions. An efficient radiation energy absorber that functions to absorb energy and deliver it to the reactants is also present in this coating. Energy may then be applied by way of, for example, a laser or infrared light. Upon application of the energy, either the oxidizer, the leucozine dye, or both may become heated and mix which causes the leucozine dye to become oxidized and a mark to be produced.

Referring now to the embodiments illustrated in FIG. 1, there is shown imaging medium 100, energy 110, substrate 120, imaging composition 130, and suspended particles 140. Imaging medium 100 may comprise a substrate 120. Substrate 120 may be any substrate upon which it is desirable to make a mark, such as, by way of example only, paper (e.g., labels, tickets, receipts, or stationary), overhead transparencies, or the labeling surface of an optical disk such as a CD-R/RW/ROM, DVD-R/RW/ROM, or blue laser or blue ray disk.

Imaging composition 130 may comprise a matrix, an oxidizer, a radiation absorbing compound such as a dye, and a leucozine dye. The oxidizer and the leucozine dye, when mixed, may change color. Either of the oxidizer and the leucozine dye may be soluble in the matrix. The other component (oxidizer or leucozine dye) may be substantially insoluble in the matrix and may be suspended in the matrix as uniformly distributed particles 140. The imaging composition 130 may be applied to the substrate via any acceptable method, such as, by way of example only, rolling, spraying, or screen printing.

Energy 110 may be directed imagewise to imaging medium 100. The form of energy may vary depending upon the equipment available, ambient conditions, and desired result. Examples of energy which may be used include IR radiation, UV radiation, x-rays, or visible light. The antenna may absorb the energy and heat the imaging composition 130. The heat may cause suspended particles 140 to reach a temperature sufficient to cause the interdiffusion of the color forming species initially present in the particles (e.g., glass transition temperatures ($T_g$) or melting temperatures ($T_m$) of particles 140 and matrix). The oxidizer and leucozine dye may then react to form a color.

By way of example only, the following compounds may be suitable antennae: IR780 (available from Aldrich Chemical, Milwaukee, Wis.) (3), IR783 (available from Aldrich) (4), Syntec 9/1 (5), Syntec 9/3 (6) or metal complexes (such as dithiolane metal complexes (7) and indoaniline metal complexes (8)).

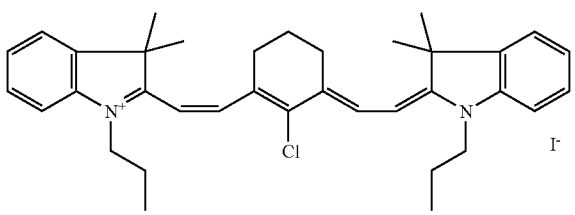

(3)

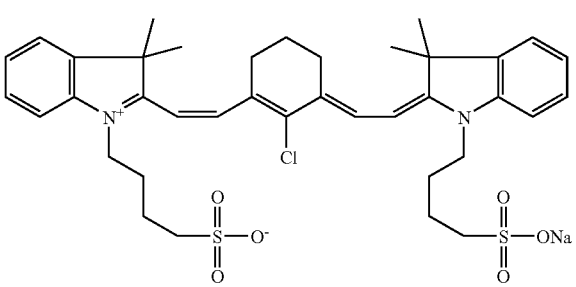

(4)

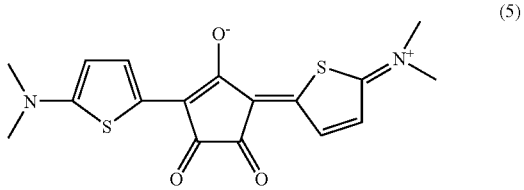

(5)

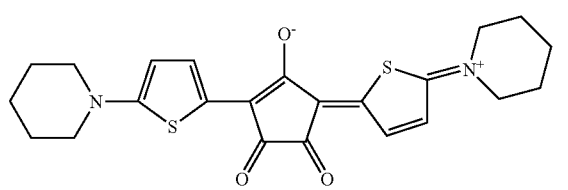

(6)

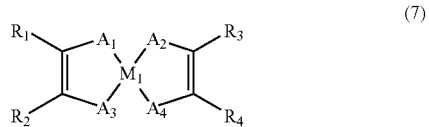

(7)

where $M_1$ is a transition metal, $R_1$, $R_2$, $R_3$, and $R_4$ are each individually alkyl or aryl groups with or without halo substituents, and $A_1$, $A_2$, $A_3$, and $A_4$ can be S, NH, or Se;

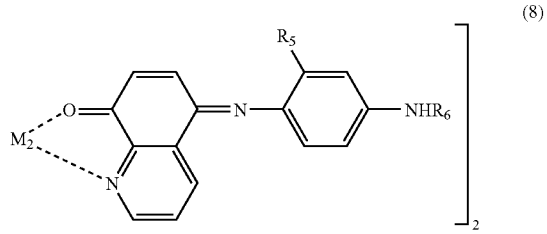

(8)

where $M_2$ is Ni or Cu and $R_5$ and $R_6$ are each individually aryl or alkyl groups with or without halo substituents.

In other embodiments, the radiation antenna can be selected from compounds which absorb energy in a wavelength range of from about 600 nm to about 720 nm, such as about 650 nm. Non-limiting examples of suitable radiation antennae for use in this range of wavelengths may include indocyanine dyes such as 3H-indolium,2-[5-(1,3-dihydro-3,3-dimethyl-1-propyl-2H-indol-2-ylidene)-1,3-pentadienyl]-3,3-dimethyl-1propyl iodide) ($\lambda_{max} \approx 642$ nm); 3H-indolium,1-butyl-2-[5-(1-butyl-1,3-dihydro-3,3-dimethyl-2H-indol-2-ylidene)-1,3-pentadienyl]-3,3-dimethyl perchlorate ($\lambda_{max} \approx 642$ nm); and phenoxazine derivatives such as phenoxazin-5-ium,3,7-bis(diethylamino) perchlorate ($\lambda_{max} \approx 645$ nm). Phthalocyanine dyes having a $\lambda_{max}$ of about the desired development wavelength can also be used such as silicon 2,3-napthalocyanine bis(trihexylsilyloxide) and matrix soluble derivatives of 2,3-napthalocyanine; matrix soluble derivatives of silicon phthalocyanine (as described in Rodgers, A. J. et al., 107 J. Phys. Chem. A 3503-3514, May 8, 2003), and matrix soluble derivatives of benzophthalocyanines (as described in Aoudia, Mohamed, 119 J. Am. Chem. Soc. 6029-6039, Jul. 2, 1997); phthalocyanine compounds such as those described in U.S. Pat.

Nos. 6,015,896 and 6,025,486; and Cirrus 715 (a phthalocyanine dye available from Avecia, Manchester, England having a $\lambda_{max} \approx 806$ nm).

In other embodiments, laser light having blue and indigo wavelengths from about 300 nm to about 600 nm may be used to develop the color forming compositions when antenna which absorb blue and indigo radiation are used. For example, recently developed commercial lasers found in certain DVD and laser disk recording equipment provide for energy at a wavelength of about 405 nm. Radiation antennae which can be useful for optimization in the blue and indigo wavelengths may include, but are not limited to, aluminum quinoline complexes, porphyrins, porphins, and mixtures or derivatives thereof. Non-limiting specific examples of suitable radiation antenna may include 1-(2-chloro-5-sulfophenyl)-3-methyl-4-(4-sulfophenyl)azo-2-pyrazolin-5-one disodium salt ($\lambda_{max} \approx 400$ nm); ethyl 7-diethylaminocoumarin-3-carboxylate ($\lambda_{max} \approx 418$ nm); 3,3'-diethylthiacyanine ethylsulfate ($\lambda_{max} \approx 424$ nm); 3-allyl-5-(3-ethyl-4-methyl-2-thiazolinylidene) rhodanine ($\lambda_{max} \approx 430$ nm), and mixtures thereof. Non-limiting specific examples of suitable aluminum quinoline complexes may include tris(8-hydroxyquinolinato)aluminum and derivatives such as tris(5-cholor-8-hydroxyquinolinato)aluminum; 2-(4-(1-methylethyl)-phenyl)-6-phenyl-4H-thiopyran-4-ylidene)-propanedinitril-1,1-dioxide; 4,4'-[1,4-phenylenebis(1,3,4-oxadiazole-5,2-diyl)]bis N,N-diphenyl benzeneamine; bis-tetraethylammonium-bis(1,2-dicyano-dithiolto)-zinc(II); 2-(4,5-dihydronaphtho[1,2-d]-1,3-dithiol-2-ylidene)-4,5-dihydro-naphtho[1,2-d]1,3-dithiole. Non-limiting examples of specific porphyrin and porphyrin derivatives can include etioporphyrin 1 (Formula 9)

deuteroporphyrin IX 2,4 bis ethylene glycol (Formula 10)

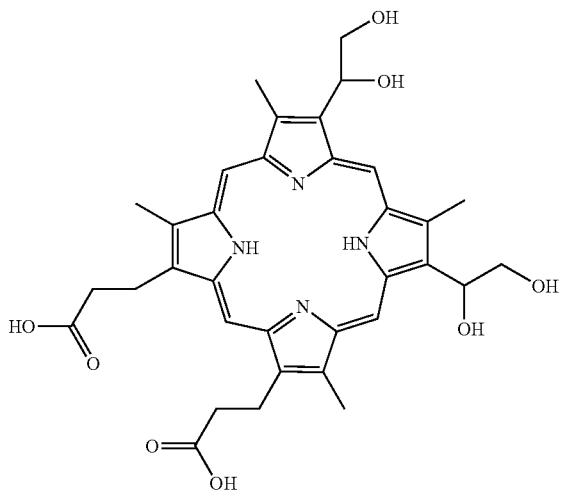

(available from Frontier Scientific); and octaethyl porphrin; azo dyes such as Mordant Orange (available from Aldrich); Methyl Yellow (Formula 11)

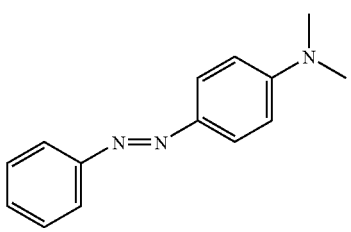

4-phenylazoaniline; Alcian Yellow (Formula 12)

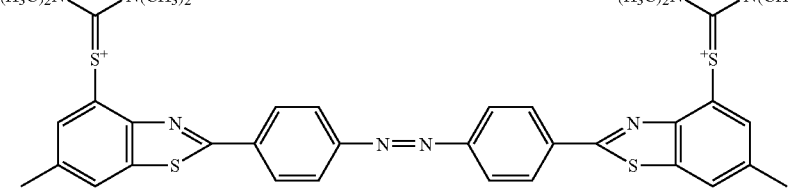

and mixtures thereof.

Additional examples of antennae may be found in "Infrared Absorbing Dyes," Matsuoka, Masaru, ed., Plenum Press (1990) and "Near-Infrared Dyes for High Technology Applications," Daehne, S.; Resch-Genger, U.; Wolfbeis, O., Ed., Kluwer Academic Publishers.

The oxidizer (e.g., calcium nitrate) and leucozine dye 90 (e.g., benzoyl leuco methylene blue (Formula 13)), may act in tandem to produce a mark.

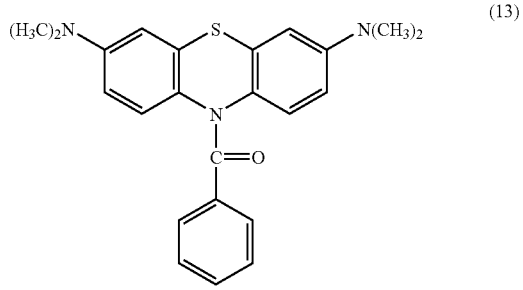

(13)

When reacted, the oxidizer may initiate a color change in the dye or develop the dye. One of the oxidizer and the dye may be soluble in the matrix (e.g., lacquer 30) at ambient conditions. The other may be substantially insoluble in the lacquer at ambient conditions. By "substantially insoluble," it is meant that the solubility of the other in the lacquer at ambient conditions is so low, that no or very little color change may occur due to reaction of the dye and the oxidizer at ambient conditions. Although, in the embodiments described above, the oxidizer may be dissolved in the lacquer and the leucozine dye remains suspended as a solid in the matrix at ambient conditions, it is also acceptable that the leucozine dye may be dissolved in the matrix and the oxidizer may remain as a suspended solid at ambient conditions. Oxidizers may include, without limitation, compounds such as group I and group II metal nitrate, or any compound that has electron deficient moiety capable of abstraction of electrons from an electron rich molecule (e.g., aromatic compounds, transition metal salts and complexes of metals such as cerium (IV), (e.g., ceric ammonium nitrate), molybdenum, tungsten (e.g., phosphomolybdic acid, phosphotungestic acid, ammonium hexamolybdate, and ammonium heptamolybdate), singlet oxygen, ozone, organic peroxides such as tertbutyl hydroperoxide, benzoyl peroxide, peroxydicarbonate esters, or any substance which oxidizes the leucozine dye and causes a color change.

Lacquer 30 may be any suitable matrix for dissolving and/or dispersing the oxidizer, antenna, and leucozine dye. Acceptable lacquers may include, by way of example only, UV curable matrices such as acrylate derivatives, oligomers and monomers, with or without a photo package. A photo package may include a light absorbing species which initiates reactions for curing of a lacquer, such as, by way of example, benzophenone derivatives. Other examples of photoinitiators for free radical polymerization monomers and pre-polymers include but are not limited to: thioxanethone derivatives, anthraquinone derivatives, acetophenones and benzoine ether types. It may be desirable to choose a matrix which is cured by a form of radiation other than the type of radiation which causes a color change. Matrices based on cationic polymerization resins may require photo-initiators based on aromatic diazonium salts, aromatic halonium salts, aromatic sulfonium salts and metallocene compounds. An example of an acceptable lacquer or matrix may include Nor-Cote CDG000 (a mixture of UV curable acrylate monomers and oligomers available from Nor-Cote International, Inc., Crawfordsville, Ind.) which contains a photoinitiator (hydroxy ketone) and organic solvent acrylates (e.g., methyl methacrylate, hexyl methacrylate, beta-phenoxy ethyl acrylate, and hexamethylene acrylate). Other acceptable lacquers or matrices may include acrylated polyester oligomers such as CN293 and CN294 (available from Sartomer Co., Exton, Pa.).

EXAMPLE

A method for preparing an imaging composition may comprise making a two phase composition, one containing the color former phase and another containing oxidizer phase, intimately mixed, but not dissolved in each other.

For example a light activated coating was prepared as follows: A first solution of 0.160 g benzoyl leuco methylene blue; 0.460 g Resorcinal (i.e.,1,3-benzenediol); 0.960 g Phenidone (i.e., 1-Phenyl-3-pyrazolidone); and 0.005 g IR 780PP (available from American Dye Source, Baie d'Urfe', Quebec, Canada); in 4 mL tetrahydrofuran was prepared.

A second solution of 0.130 g calcium nitrate; 0.112 g para-toluenesulfonic acid; and 4 g 10% polyvinyl alcohol in water was prepared.

A mixture of equal amounts of the first solution and the second solution were mixed on the surface of a polycarbonate optical disc and a glass slide and dried with warm air flow. Direct marking was effected on the resulting coated substrates with a 35 mW laser operating at 780 nm. A dark mark was registered on the surface of an optical disk, and the glass slide. Direct marking occurs when the desired image is marked on the imaging medium, without the use of a printing intermediary.

In other embodiments, it may be desirable to combine the leucozine dye/oxidizer system as disclosed and claimed herein with a second system for imaging (for example, as disclosed in U.S. Published Patent Application 20040146812 to Gore et al.) such that there are multiple color formers which form color via multiple mechanisms and it may be possible to form multicolor images.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A direct imaging composition comprising:
   a matrix;
   an antenna dissolved in the matrix;
   a leucozine dye; and
   an oxidizer for oxidizing said leucozine dye;
   wherein one of the leucozine dye and the oxidizer is soluble in the matrix or matrix precursor at ambient conditions;
   wherein the soluble of the leucozine dye and the oxidizer is dissolved in the matrix;
   wherein the other of the leucozine dye and the oxidizer is substantially uniformly distributed in the matrix,
   said antenna being capable of absorbing light energy and delivering heat to said composition to cause mixing of said leucozine dye and said oxidizer such that said dye becomes oxidized.

2. The composition of claim 1 wherein the leucozine dye comprises at least one compound chosen from the group consisting of phenazines, oxazines, and thiazines.

3. The composition of claim 1 wherein the leucozine dye comprises benzoyl leuco methylene blue.

4. The composition of claim 1 wherein the oxidizer is selected from the group consisting of calcium nitrate, transition metal salts, metal complexes, cerium(IV) complexes, ceric ammonium nitrate, molybdenum complexes, tungsten complexes, phosphomolybdic acid, phosphotungestic acid, ammonium hexamolybdate, ammonium heptamolybdate, perchlorates, permanganates, dichromate salts, singlet oxygen, ozone, organic peroxides, tertbutyl hydroperoxide, benzoyl peroxide, peroxydicarbonate esters, and mixtures thereof.

5. A direct imaging composition comprising:
a matrix;
an antenna dissolved in the matrix;
a leucozine dye; and
an oxidizer;
wherein one of the leucozine dye and the oxidizer is soluble in the matrix or matrix precursor at ambient conditions;
wherein the soluble of the leucozine dye and the oxidizer is dissolved in the matrix;
wherein the other of the leucozine dye and the oxidizer is substantially uniformly distributed in the matrix,
wherein the antenna comprises at least one of the compounds chosen from the group consisting of quinones, phthalocyanines, naphthalocyanines, indocyanines, phenoxazines, phenoxazine derivatives, aluminum quinoline complexes, porphyrins, porphins, porphyrin derivatives, metal complexes, azo dyes, croconium dyes, squarilium dyes, hexafunctional polyester oligomers, and the compounds represented by the following formulae:

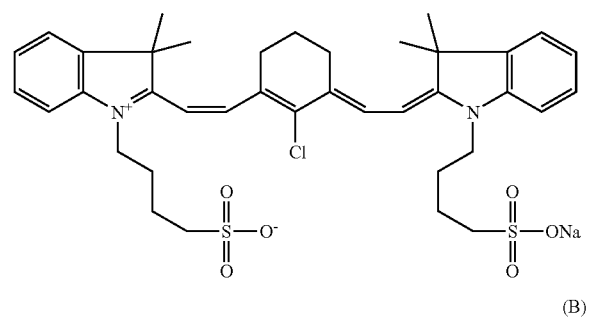

(A)

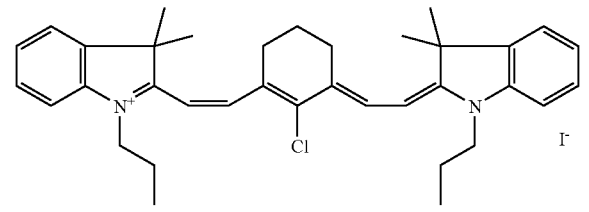

(B)

-continued

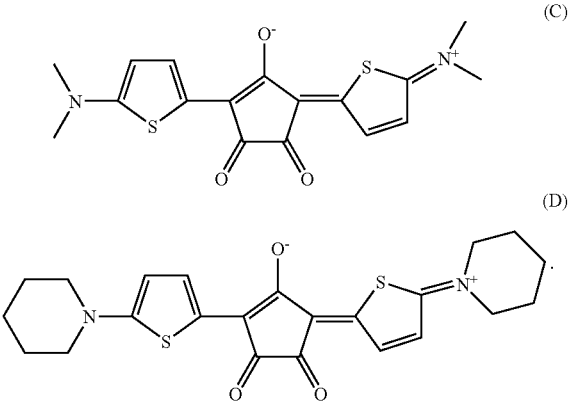

(C)

(D)

6. An image recording medium, the medium comprising:
a substrate
an imaging composition comprising, a solvent; an antenna; a leucozine dye; and an oxidizer, said antenna being capable of absorbing light energy and delivering heat to said composition to cause reaction of said leucozine dye and said oxidizer;
wherein the leucozine dye changes color when oxidized by the oxidizer;
wherein one of the oxidizer and the leucozine dye is soluble in the solvent at ambient conditions;
wherein the other of the oxidizer and the leucozine dye is substantially insoluble in the solvent at ambient conditions;
wherein the substantially insoluble component is substantially uniformly distributed in the solvent; and
wherein the imaging composition is directly or indirectly applied to the substrate.

7. The medium of claim 6 wherein the leucozine dye is selected from the group consisting of thiazines, phenazines, and oxazines.

8. The medium of claim 6 wherein the oxidizer is selected from the group consisting of calcium nitrate, transition metal salts, metal complexes, cerium(IV) complexes, ceric ammonium nitrate, molybdenum complexes, tungsten complexes, phosphomolybdic acid, phosphotungestic acid, ammonium hexamolybdate, ammonium heptamolybdate, perchlorates, permanganates, dichromate salts, singlet oxygen, ozone, organic peroxides, tertbutyl hydroperoxide, benzoyl peroxide, peroxydicarbonate esters, and mixtures thereof.

9. A direct imaging composition comprising:
a matrix;
an antenna dissolved in the matrix;
a leucozine dye; and
an oxidizer;
wherein one of the leucozine dye and the oxidizer is soluble in the matrix or matrix precursor at ambient conditions;
wherein the soluble of the leucozine dye and the oxidizer is dissolved in the matrix;
wherein the other of the leucozine dye and the oxidizer is substantially uniformly distributed in the matrix, and
wherein the antenna comprises at least one of the compounds chosen from the group consisting of quinones, phthalocyanines, naphthalocyanines, indocyanines, phenoxazines, phenoxazine derivatives, aluminum quinoline complexes, porphyrins, porphins, porphyrin derivatives, metal complexes, azo dyes, croconium dyes, squarilium dyes, hexafunctional polyester oligomers, and the compounds represented by the following formulae

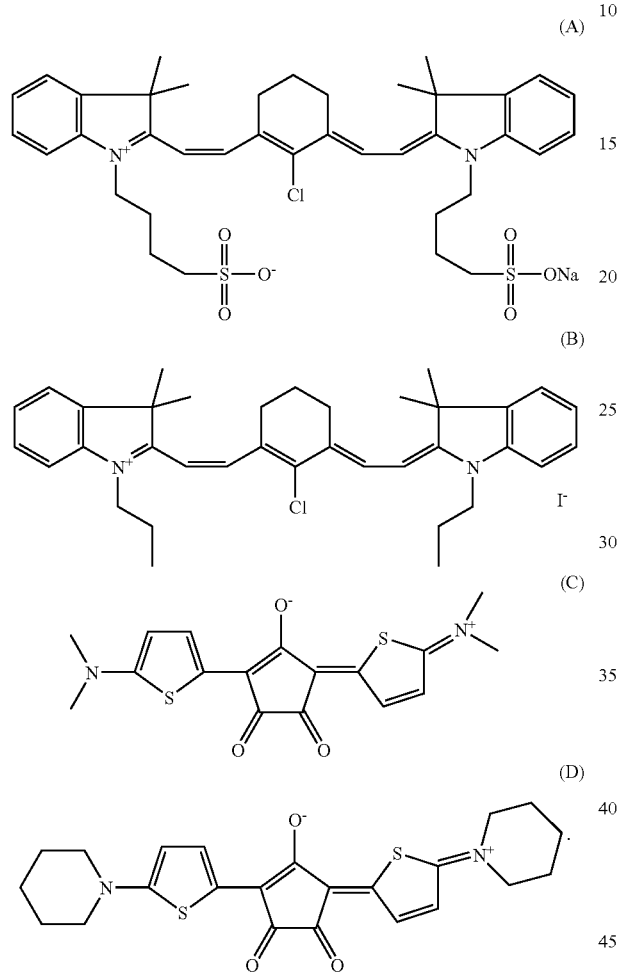

10. The medium of claim 6 wherein the substrate comprises an optical disk.
11. A method for imaging, the method comprising:
providing the image recording medium of claim 6;
directing imagewise enough energy at the medium to cause the oxidizer to cause the leucozine dye to change color.
12. The method of claim 11 wherein the image recording medium is an optical disk.
13. The method of claim 11 wherein the energy is applied by a laser.
14. The method of claim 11 wherein the leucozine dye is selected from the group consisting of phenazines, thiazines, and oxazines.
15. The method of claim 11 wherein the oxidizer is selected from the group consisting of calcium nitrate, transition metal salts, metal complexes, cerium(IV) complexes, ceric ammonium nitrate, molybdenum complexes, tungsten complexes, phosphomolybdic acid, phospho tungestic acid, ammonium hexamolybdate, ammonium heptamolybdate, perchlorates, permanganates, dichromate salts, singlet oxygen, ozone, organic peroxides, tertbutyl hydroperoxide, benzoyl peroxide, peroxydicarbonate esters, and mixtures thereof.

16. An imaging means, the means comprising:
a means for absorbing energy;
a means for forming color, comprising a leucozine dye;
a means for initiating a color change in the color forming means, comprising an oxidizer for oxidizing said leucozine dye;
a means for binding the absorbing means, the color forming means, and the initiating means;
wherein the absorbing means is dissolved in the binder;
wherein one of the means for forming color and the means for initiating is soluble in the means for binding at ambient conditions;
wherein the other of the means for forming color and the means for initiating is substantially insoluble in the means for binding at ambient conditions; and
wherein the insoluble component is substantially uniformly distributed in the binder,
said means for absorbing energy being capable of absorbing light energy and delivering heat to said composition to cause mixing of said leucozine dye and said oxidizer such that said dye becomes oxidized.

17. The means of claim 16 wherein the means for initiating is selected from the group consisting of calcium nitrate, transition metal salts, metal complexes, cerium(IV) complexes, ceric ammonium nitrate, molybdenum complexes, tungsten complexes, phosphomolybdic acid, phosphotungestic acid, ammonium hexamolybdate, ammonium heptamolybdate, perchlorates, permanganates, dichromate salts, singlet oxygen, ozone, organic peroxides, tertbutyl hydroperoxide, benzoyl peroxide, peroxydicarbonate esters, and mixtures thereof.

18. The means of claim 16 wherein the means for absorbing comprises at least one of the compounds chosen from the group consisting of quinones, phthalocyanines, naphthalocyanines, indocyanines, phenoxazines, phenoxazine derivatives, aluminum quinoline complexes, porphyrins, porphins, porphyrin derivatives, metal complexes, azo dyes, croconium dyes, squarilium dyes, hexafunctional polyester oligomers, and the compounds represented by the following formulae:

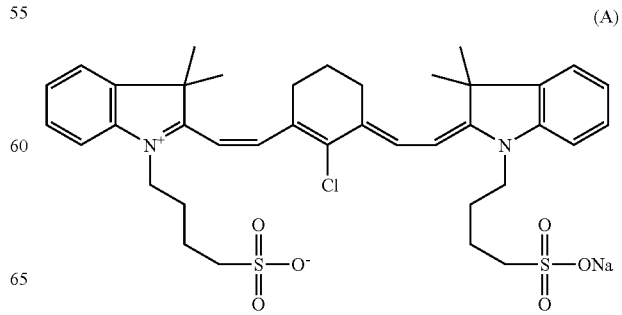

-continued

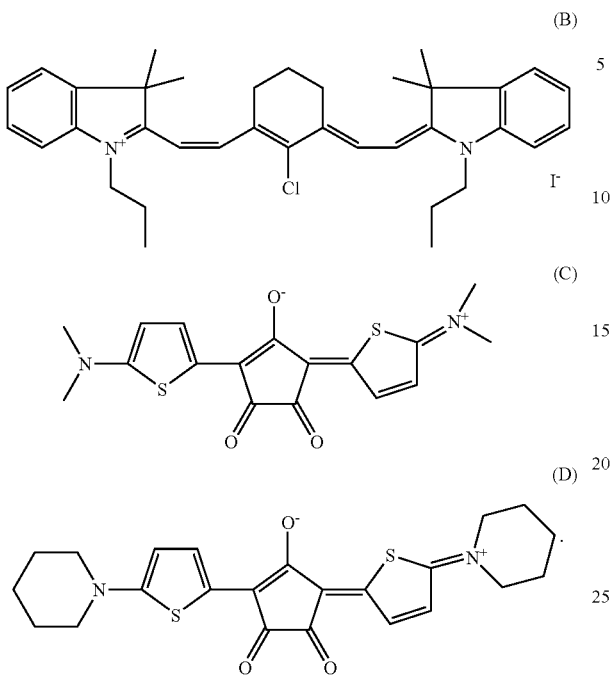

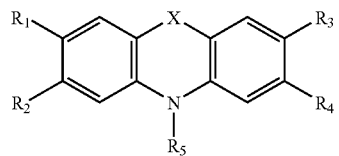

where X is any of nitrogen, sulfur, or oxygen and $R_1$, $R_2$, $R_3$, $R_4$ and $R_5$ are each, individually, any of H, $SO_2C_6H_5$, N-alkyl, N-alkyl$_2$, N-aryl, N-acyl, OH, O-acyl, acyl, or the functional group represented by the following formula:

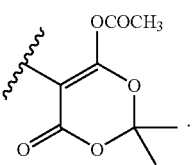

19. The composition of claim 2 wherein said at least one leucozine dye is a compound represented by the following formula:

20. The method of claim 11 wherein directing imagewise enough energy at the medium to cause the oxidizer to cause the leucozine dye to change color comprises causing said antenna to heat said composition, allowing said leucozine dye and the oxidizer to mix and react, causing the leucozine dye to change color and a mark to be produced.

* * * * *